United States Patent
Gillespie et al.

(10) Patent No.: US 10,430,154 B2
(45) Date of Patent: Oct. 1, 2019

(54) TONAL/TRANSIENT STRUCTURAL SEPARATION FOR AUDIO EFFECTS

(71) Applicant: Eventide Inc., Little Ferry, NJ (US)

(72) Inventors: Dan J. Gillespie, Astoria, NY (US); Russell Wedelich, Bronx, NY (US); Anthony M. Agnello, Princeton, NJ (US); Corey Kereliuk, Frederiksberk (DK); Stewart Lerman, New York, NY (US)

(73) Assignee: Eventide Inc., Little Ferry, NJ (US)

( * ) Notice: Subject to any disclaimer, the term of this patent is extended or adjusted under 35 U.S.C. 154(b) by 0 days.

(21) Appl. No.: 15/712,797

(22) Filed: Sep. 22, 2017

(65) Prior Publication Data

US 2018/0088899 A1 Mar. 29, 2018

Related U.S. Application Data

(60) Provisional application No. 62/398,790, filed on Sep. 23, 2016.

(51) Int. Cl.
| | |
|---|---|
| *G06F 3/16* | (2006.01) |
| *G10L 21/0272* | (2013.01) |
| *G10L 25/18* | (2013.01) |
| *H04S 7/00* | (2006.01) |
| *G10L 21/028* | (2013.01) |

(Continued)

(52) U.S. Cl.
CPC .......... *G06F 3/165* (2013.01); *G10L 21/028* (2013.01); *G10L 21/0272* (2013.01); *G10L 25/18* (2013.01); *G10L 25/48* (2013.01); *H04S 7/30* (2013.01); *G10L 25/93* (2013.01);

(Continued)

(58) Field of Classification Search
None
See application file for complete search history.

(56) References Cited

U.S. PATENT DOCUMENTS

| | | | | |
|---|---|---|---|---|
| 2012/0051549 A1* | 3/2012 | Nagel | .......... | G10L 19/025 381/56 |
| 2014/0270181 A1* | 9/2014 | Siciliano | ............ | G11B 27/038 381/17 |

FOREIGN PATENT DOCUMENTS

| | | |
|---|---|---|
| WO | 2012058229 A1 | 5/2012 |
| WO | 2016126715 A1 | 8/2016 |
| WO | 2016146265 A1 | 9/2016 |

OTHER PUBLICATIONS

International Search report for PCTIB2017001440 dated Feb. 23, 2018.

(Continued)

*Primary Examiner* — Curtis A Kuntz
*Assistant Examiner* — Kenny H Truong
(74) *Attorney, Agent, or Firm* — Lerner, David, Littenberg, Krumholz & Mentlik, LLP

(57) ABSTRACT

The technology relates to processing one or more audio streams. The processing may include segmenting the one or more audio streams into structural components comprising a tonal stream and a transient stream. The tonal stream and the transient stream may be processed and combined to provide an output sound signal. The one or more audio streams may include a first audio stream from a first sound source and a second audio stream from a second sound source. The tonal stream may comprise sound from the first audio stream and the transient stream may comprise sound from the second audio stream. One or more sound effects may be added to the tonal stream or transient stream prior to combining.

20 Claims, 8 Drawing Sheets

(51) Int. Cl.
G10L 25/48 (2013.01)
H04R 3/00 (2006.01)
G10L 25/93 (2013.01)

(52) U.S. Cl.
CPC .......... *H04R 3/005* (2013.01); *H04S 2400/11* (2013.01); *H04S 2400/15* (2013.01)

(56) References Cited

OTHER PUBLICATIONS

Lachambre, Boussard et al, "Separation of Tonal and Transient Components for Sound Design Remixing", The 22nd International Congress on Sound and Vibration, Jul. 16, 2015, pp. 1-8.

* cited by examiner

TONAL/TRANSIENT STRUCTURAL SEPARATION FOR AUDIO EFFECTS

CROSS-REFERENCE

The present application claims the benefit of the filing date of U.S. Provisional Application No. 62/398,790, filed Sep. 23, 2016, the disclosure of which is hereby incorporated by reference herein.

BACKGROUND

Audio engineers, musicians, and even general the general population (collectively "users") have been generating and manipulating audio signals for decades. For instance, audio engineers generate stereo signals by mixing together monophonic audio signals using effects such as pan and gain to position them within the stereo field. Users also manipulate audio signals into individualize components for effects processing using multiband structures, such as crossover networks, for multiband processing. Additionally, musicians and audio engineers regularly use audio effects, such as compression, distortion, delay, reverberation, etc., to create sonically pleasing, and in some cases unpleasant sounds.

Audio signal manipulation is typically performed using specialized software or hardware. The type of hardware and software used to manipulate the audio signal is generally dependent upon the user's intentions. For example, musicians tend to use hardware such as foot pedals, amplifiers, and rack mounted effects processors to manipulate the sound signal output by the instrument they are playing. Audio engineers tend to use analog mixers, digital audio workstations (DAW's), audio plug-ins, rack mounted effects processors, and other such hardware and software to manipulate audio signals with the goal of creating a cohesive group of sound signals which are combined together to create a completed project. Users are constantly looking for new ways to create and manipulate audio signals.

BRIEF SUMMARY

One aspect of the disclosure provides a method for processing one or more audio streams. The method may include segmenting, by one or more processors, the one or more audio streams into structural components comprising a tonal stream and a transient stream. The tonal stream and the transient stream may be individually processed and the processed individual tonal and transient streams may be combined to provide an output sound signal.

In some instances processing may comprise adding one or more sound effects to the tonal stream or transient stream prior to combining.

In some instances the one or more audio streams include a first audio stream from a first sound source and a second audio stream from a second sound source, and the tonal stream comprises sound from the first audio stream and the transient stream comprises sound from the second audio stream.

In some instances the transient stream includes a portion of the one or more audio streams which represent sharp, quick, and immediate sounds.

In some instances the tonal stream includes a portion of the one or more audio streams which represent stable, repetitive, and otherwise predictable sounds.

In some instances the method may include segmenting the one or more audio streams into structural components comprising a tonal stream and a transient stream comprises isolating spectral peaks within the one or more audio streams, determining the spectral stability of the spectral peaks, and segmenting portions of the one or more audio streams associated spectral peaks having stability greater than a threshold value into the tonal stream.

In some instances the method may include segmenting portions of the one or more audio streams associated with spectral peaks having stability less than a threshold value into the transient stream.

In some instances isolating spectral peaks within the one or more audio streams includes processing a segment of the one or more audio streams with a Short Time Fourier Transform (STFT) to generate a frequency domain representation of the segment.

In some instances determining the spectral stability of the spectral peaks includes portioning the frequency domain representation into bins having a fixed frequency width and selecting bins having a consistent magnitude and frequency as spectral peaks.

In some instances segmenting the one or more audio streams into structural components comprising a tonal stream and a transient stream comprises performing morphological component analysis (MCA) on the one or more audio streams.

In some instances MCA includes defining a tonal dictionary defined by a first set of complex exponentials which form a first set of basis functions for a Fast Fourier Transform (FFT) and a transient dictionary defined by a second set of complex exponentials which form a second set of basis functions for another FFT, wherein the first set of basis functions is larger than the second set of basis functions.

In some instances MCA includes defining a transient dictionary as a collection of wavelet bases which make up a fast wavelet transform decomposition of a frame of the one or more audio streams at a selected scale.

Another aspect of the disclosure provides a system, comprising one or more computing devices, configured to process one or more audio streams. The system may segment one or more audio streams into structural components comprising a tonal stream and a transient stream and individually process the tonal stream and the transient stream. The system may combine the processed individual tonal and transient streams to provide an output sound signal. In some instances the one or more computing devices may be configured to add one or more sound effects to the tonal stream or transient stream. In some instances the one or more computing devices may be configured to segment portions of the one or more audio streams associated with spectral peaks having stability less than a threshold value into the transient stream.

Another aspect of the disclosure provides a method including receiving a first audio signal generated by a first sound source, receiving a second audio signal generated by a second sound source, segmenting, by one or more processors, the first audio signal into a first tonal audio stream and a first transient audio stream, segmenting, by the or more processors, the second audio signal into a second tonal audio stream and a second transient audio stream, and selectively combining either the first tonal audio stream or the first transient audio stream with either the second tonal audio stream or the second transient audio stream.

Another aspect of the disclosure provides a system, comprising one or more computing devices, configured to receive a first audio signal generated by a first sound source; receive a second audio signal generated by a second sound source; segment the first audio signal into a first tonal audio stream and a first transient audio stream; segment the second audio signal into a second tonal audio stream and a second transient audio stream; and selectively combine either the first tonal audio stream or the first transient audio stream with either the second tonal audio stream or the second transient audio stream.

BRIEF DESCRIPTION OF THE DRAWINGS

The foregoing aspects, features and advantages of the present invention will be further appreciated when considered with reference to the following description of exemplary embodiments and accompanying drawings, wherein like reference numerals represent like elements. In describing the embodiments of the invention illustrated in the drawings, specific terminology may be used for the sake of clarity. However, the aspects of the invention are not intended to be limited to the specific terms used.

FIG. 6 is an illustration of an example structural split system plug-in.

DETAILED DESCRIPTION

Overview

Figure 1:
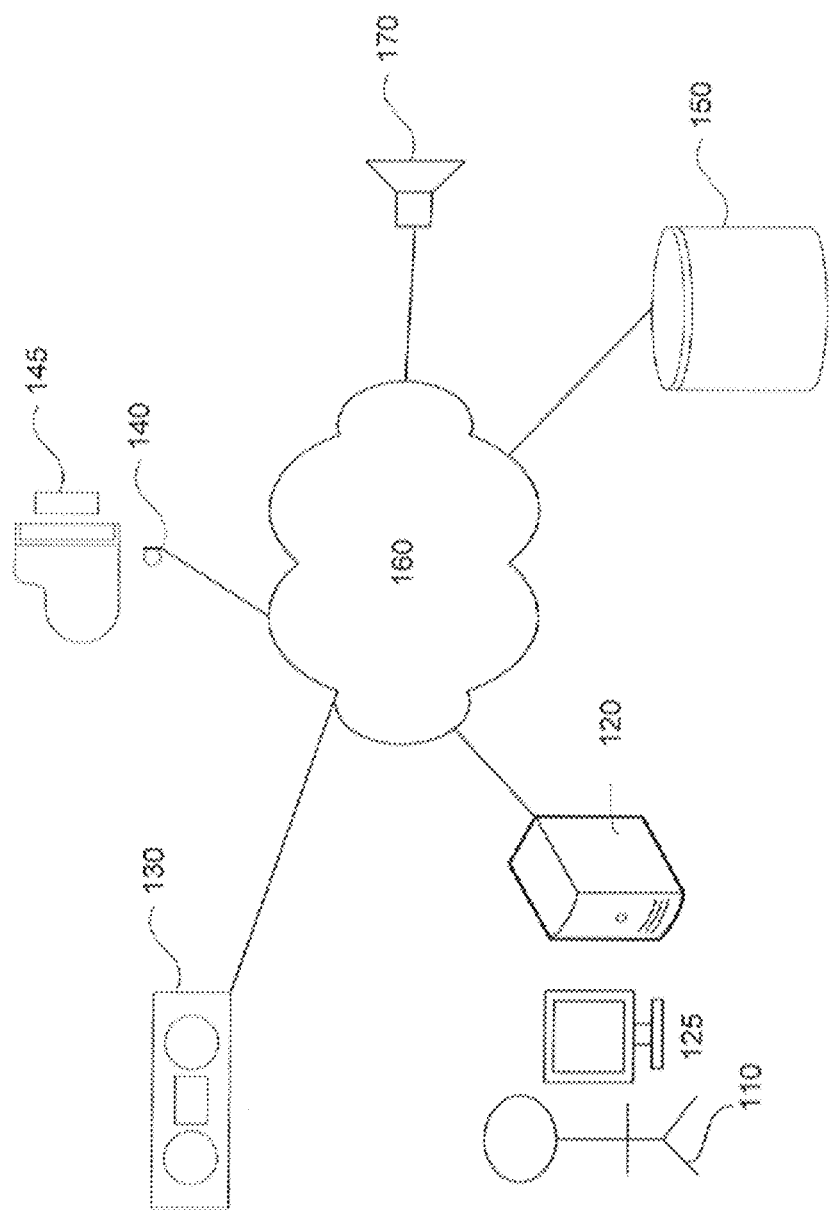
FIG. 1 is a pictorial diagram of an example system in accordance with aspects of the disclosure.

This technology relates to the real-time separating of an audio stream into distinct tonal and transient structures, such that audio effects may be applied to the tonal and transient structures. The tonal and transient structures, including the audio effects, may then be reassembled into a new audio stream. For instance, an audio stream such as an audio signal generated by a microphone capturing a snare drum hit may be separated into tonal and transient structures, which when recombined, make up the original audio signal. The tonal and transient structures may be individually manipulated with audio effects processing such as equalization, compression, reverberations, and other such effects. The manipulated tonal and transient structures may then be recombined into a new audio stream.

The tonal and transient structures represent different, but complementary features of the audio stream. In this regard, the transient structure includes a portion of the audio stream which represents the sharp, quick, and immediate parts of a sound. For example, the transient structure may include sounds such as the initial hit of a drumstick on the snare drum, the plosives and fricatives of voice, the pluck of a guitar string, and the hammer hitting the piano string.

The tonal structure contains the portion of the audio stream which represents the stable, repetitive, and otherwise predictable parts of a sound. For example the tonal structure may include sounds such as the oscillations of a guitar string, the resonance of a snare drum, sustaining piano strings, and other such ongoing, smooth, and repetitive sounds.

The audio stream may include one or more audio signals. In this regard, the audio stream may include a single audio signal, a collection of audio signals which are combined together into a single audio stream, and one or more discrete audio signals. The audio stream may be generated, or otherwise received from one or more sources, such as a digital audio device, an analog audio device (e.g., an analog microphone), or any combination of such devices.

To separate the audio stream, in real-time, into tonal and transient structures, two processing techniques may be used. In the first process, the shape of frequency spectrum of the audio stream may be processed to isolate spectral peaks. The spectral stability of the spectral peaks may be measured to identify the stable parts of the audio stream. These stable parts may represent the tonal structures of the audio stream. The tonal structures may then be removed from the audio stream, thereby leaving behind the transient structures.

The second process is based on Morphological Component Analysis (MCA). In this regard, an audio stream can be recreated based on separate sound dictionaries, with one dictionary including the tonal structures and the second dictionary may including the transient structures of the audio stream.

The tonal and transient structures can be manipulated independently. The manipulated tonal and transient structures may be recombined to create a new audio stream. For example, the tonal ring resulting from a snare drum hit may be removed from the tonal structure. When the tonal structure, having the snare drum hit removed, is recombined with the transient structure the resulting audio stream will include only the transient strike portion of the snare drum hit. In another example, the pick attack of a guitar note may be removed from the tonal structure may be removed such that when the tonal structure is recombined with the transient structure the guitar note sounds bowed. Other effects, such as adding short delays to either advance or retard the transient structure relative to the tonal structure before recombining can make subtle changes to the timbre of the new audio stream relative to the original audio stream. More drastic effects, such as delay, reverb, tremolo, etc., can also be applied separately to the tonal and transient structures resulting in the creation of sounds which were not previously possible.

The features described herein may allow for the creation of tonal and transient structures of an audio stream in real-time. The tonal and transient structures are complementary, thereby allowing them to be recombined with minimal glitches, noise, or other artifacts. By providing tonal and transient structures, audio engineers, musicians, and other users may be provided with an entirely new way to manipulate audio streams opening up new possibilities for creating new sounds.

Example Systems

Figure 2:
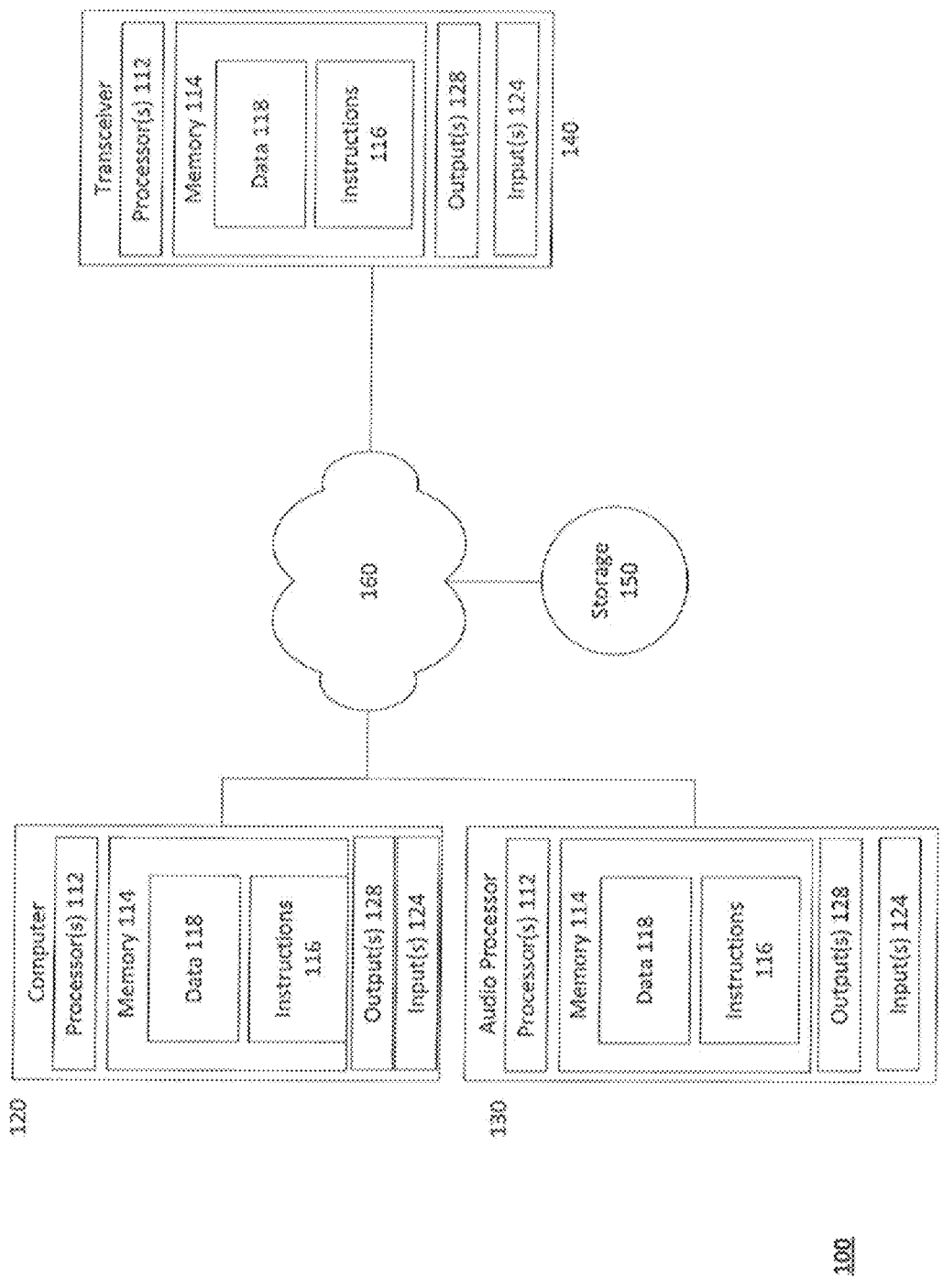
FIG. 2 is a functional diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 120 and 130 which include computer 120, audio processor 130, as well as storage system 150, transceiver 140, sound source 145, and playback device 170. Each computing device, 120 and 130, as well as may contain one or more processors (CPUs) 112, memory 114 and other components typically present in general purpose computing devices. In some instances, the transceiver may also include components typically present in general purpose computing devices.

Memory 114 of each of computing devices 120 and 130 can store information accessible by the one or more processors 112, including instructions 116 that can be executed by the one or more processors 112. Memory 114 can also include data 118 that can be retrieved, manipulated or stored by the processor. The memory can be of any non-transitory type capable of storing information accessible by the processor, such as a solid state hard drive (SSD), disk based hard-drive, memory card, ROM, RAM, DVD, CD-ROM, Blu-Ray, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in a proprietary language, object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored or modified by the one or more processors 112 in accordance with the instructions 116. For instance, although the subject matter described herein is not limited by any particular data structure, the data can be stored in computer registers, in a relational or non-relational database as a table having many different fields and records, or XML documents. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU produced by Intel, ARM, and AMD. Alternatively, the processors can be dedicated components such as an application specific integrated circuit ("ASIC"), a system on chip ("SOC"), or other hardware-based processor.

Although FIG. 1 functionally illustrates the processor, memory, and other components of computing device 120 and 130, as well as transceiver 140, as being within the same housing, the processor, memory, and other components can actually comprise multiple processors, memories, and other components that may or may not be stored within the same physical housing. For example, the memory can be a hard drive located in housings different from that of the computing devices 120 and 130. Accordingly, references to a processor, memory, or other elements will be understood to include references to more than one processors, memories, or other components which may operate independently or in parallel. Moreover, although some functions described below are indicated as taking place on a single computing device, various aspects of the subject matter described herein can be implemented by a plurality of computing devices communicating information over network 160. Additionally, each computing device 120 and 130 can be comprised of more than one computing device. Yet further, each computing device 120, 130, and transceiver 140 may be the same computing device.

Each of the computing devices 120 and 130 can be at different locations (i.e., nodes) of a network 160. Each computing device 120 and 130 may communicate directly and/or indirectly with other computing devices and components connected to the network 160. Further, although only a single transceiver 140, a single computer 120, a single storage device 150, and a single audio processor 130 are shown in FIGS. 1 and 2, there may be numerous computing devices, audio processors, transceivers, storage devices, etc., placed locally and/or remotely from each other. The audio processor 130 may be a stand-alone system programmed to perform the functions described herein.

The computing devices 120 and 130, as well as the transceiver 140, may include outputs 128 and inputs 124. In this regard, content, such as an audio signal, may be input into the computing devices, processed as described herein, and output. The inputted audio signal may be in digital or analog form. In the event the audio signal input is analog, the computing devices may convert the analog signal to a digital signal using an analog to digital converter (ADC) (not shown). The processed signal may be output through the outputs as a digital audio signal, a digital audio file, or an analog audio signal. In the event the processed signal is to be output as an analog audio signal, the computing devices may convert the processed signal to analog using a digital to analog converter (DAC). Both the DAC and ADC may be hardware and/or software. All functions of the audio processor and/or transceiver may be performed by the computer 120 and vice-versa.

The playback device 170 may include one or more speakers, such as a monitor, headphones, etc. The playback device 170 may receive or retrieve content for playback (i.e., output audible audio.) In this regard, the playback device 170 may receive processed or unprocessed signals from the transceiver 140 or computing devices 120 and 130 over the network 160 or via a direction connection. The received signal may then be output by the playback device 170. In some instances, the playback device 170 may convert digital audio signals to analog, using a DAC, to generate an analog signal which can be output by the playback device 170.

The network 160 and intervening nodes, and devices located on the network can be interconnected using various protocols and systems, such that the network can be part of the Internet, World Wide Web, specific intranets, wide area networks, or local networks. The network can utilize standard communications protocols, such as Fiber Channel Protocol ("FCP"), Ethernet, WiFi and HTTP, and other such communication protocols. In some embodiments the devices may be directly connected or wirelessly connected.

As an example, transceiver 140 may be a microphone with Wi-Fi connectivity, such that the microphone communicates through a local network 160 with computer 120. In another example, the transceiver 140 may be connected to the audio processor 130 through a wired connection, such as a balanced or unbalanced cable connection. In yet another example, computer 120 may use network 160 to transmit and receive content, such as digital audio files, to and from storage device 150.

Although the computer is 120 illustrated as a full-sized personal computing device, the computer may be a personal computing device or a mobile computing device capable of wirelessly exchanging data with other computing devices server over the network 160. By way of example only, user computing device 120 may be a mobile phone or a recording device such as a wireless-enabled PDA, a tablet PC, laptop PC, or a netbook. The computer 120 may include user inputs and outputs so that a user may input information using a small keyboard, a keypad, microphone, using visual signals with a camera, a touch screen, etc.

Storage device 150 can be of any type of computerized storage capable of storing information accessible by the computing devices, such as a SSD, a disk based hard-drive, memory card, ROM, RAM, DVD, CD-ROM, etc. In addition, storage device 150 may include a distributed storage system where data is stored on a plurality of different storage devices which may be physically located at the same or different geographic locations. Storage device 150 may be connected to the computing devices via the network 160 as shown in FIG. 1 and/or may be directly connected to any of the computing devices, such as audio processor 130, transceiver 140, or computer 120.

The storage device may be managed and/or accessed by the computing devices 120, 130, and in some instances, and/or the transceiver 140. For example, a user may interact with a plug-in application operating on the computer 120, such that plug-in application may cause the computer to store, delete, edit, and otherwise manipulate content retrieved and stored on the storage device 150. In another example, a user of the audio processor 120 may store, delete, edit, and otherwise manipulate content which is stored in in the storage device 150.

Content may include all types of analog and digital audio content. For instance, the content may include files such as FLAC, WAV, AIF, MP3, and other such digital audio format files. In some embodiments content may be a digital or analog signal generated by a transceiver. Content may be stored and retrieved from the storage device 150 and/or other locations external to the system 100, such as external media server(s), online content databases and websites, streaming services, etc. In some embodiments content may be stored locally on the computing devices or transceiver 140.

Example Methods

An audio stream may be received from a source, such as transceiver 140 which captures audio from an instrument, such as sound source 145. The audio stream may be input into a computing device for processing, such as audio processor 130 or computer 120. Although the current example show the audio stream as being received from a microphone, the audio stream may be received from any source, such as an electric guitar, a synthesizer, a keyboard, etc. In some instances the audio stream, such as an audio file, may be retrieved by the computing device from a database, such as database 150. Additionally, aspects of the present technology may be implemented as a software plug-in operating on a computing device. More generally, aspects of the present invention may be implemented as software for a computer or workstation or as a piece of stand-alone hardware.

Figure 3:
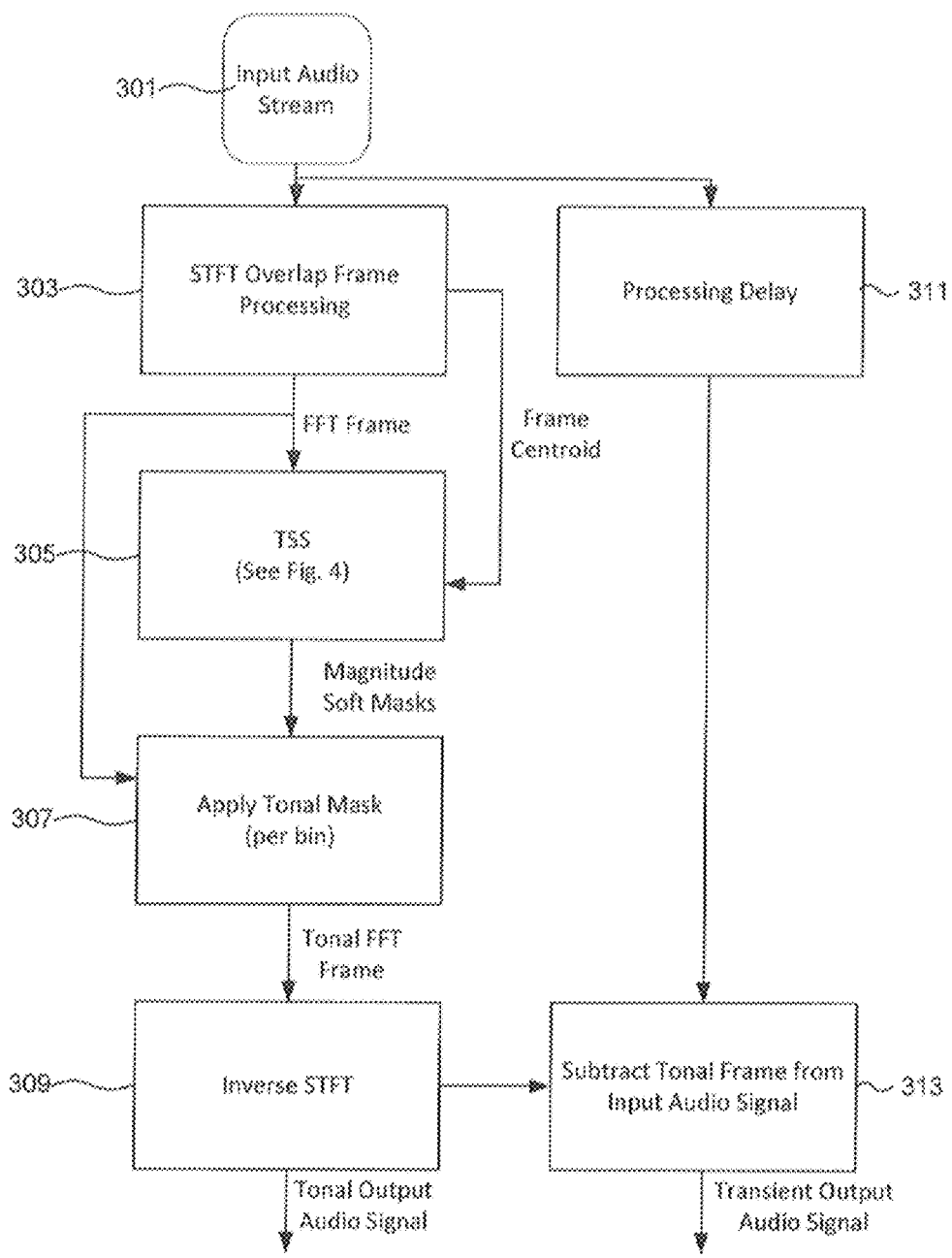
FIG. 3 is a flow diagram of frequency spectrum analysis.

The computing device may then process the audio stream and split it into tonal and transient structures using either (1) frequency spectrum analysis or (2) morphological component analysis (MCA). In the event the audio stream is in analog format, the computing device 120 or 130, or transceiver 140 may convert the audio stream to a digital audio stream prior to processing using an ADC. Referring to FIG. 3, an overview of the frequency spectrum analysis method is shown. As shown in block 303, the audio stream 301 may be continuously processed through a Short Time Fourier Transform (STFT) to obtain overlapping Fast Fourier Transform (FFT) frames for predetermined time periods. Each FFT frame includes the frequency domain information including magnitude and phase of the audio stream over the predetermined time period.

The STFT may be programmed to include specific parameters. These parameters may be input by a user through the computing device or otherwise is preprogrammed into the STFT. For instance, the STFT may include a window parameter and an overlap parameter. The window parameter may define the length of the audio stream which the STFT is transforming and the overlap parameter may define the amount of time each FFT frame overlaps by. For example, a window parameter of 0.2 seconds, with an overlap parameter of 0.1 seconds would result in the STFT outputting a first frame 0.2 seconds long captured at during a time period of 0-0.2 seconds, a second frame 0.2 seconds long captured during the time period of 0.1-0.3, a third frame 0.2 seconds long captured during the time period of 0.2-0.4 seconds, etc.

The STFT parameters of window and overlap may satisfy Constant Overlap and Add constraints for perfect, or near perfect reconstruction. To minimize folding artifacts due to spectral transformations, the STFT parameters may also satisfy the stronger constraints in the frequency domain of the frame rate falling outside of the main lobe width of the window. Further, since frequency domain multiplication of the mask is being performed, time domain circular convolution on the frame may be implied. Thus to avoid convolution artifacts, the FFT size should be at least twice the window size. To do so, the time domain frame may be zero padded prior to transforming to frequency domain via FFT.

Each FFT frame may be subjected to transient stable separation to determine transient structures, as shown in block 305 of FIG. 3. Transient stable separation is a multi-step process, as outlined in FIG. 4. Turning first to block 403, for each FFT frame 401, spectral peaks within the FFT frame are found. Spectral peaks are groupings of neighboring frequencies within the FFT frame which have a high magnitude relative to the other frequencies of the FFT frame. Spectral peaks may indicate that a tonal sound structure is present at that portion.

To identify candidate spectral peaks, each FFT frame 401 may be split into bins, with each bin having a width covering a particular range of frequencies set by a parameter, bin_width. For each bin, a determination is made whether the bin currently being processed is a peak bin containing a candidate spectral peak. For instance, the current bin being processed may be compared to the other bins within a predefined window of bins. The window of bins may be defined by another parameter, peak_width which defines the number of bins to be compared to the current bin, with the current bin being the center bin of the window of bins. If the current bin has the highest magnitude compared to the other bins, it may qualify as a candidate spectral peak bin.

To determine whether the current bin is a candidate spectral peak bin, the current bin must meet the following conditions:

1. The current bin's magnitude, normalized by total energy in a smoothed sub-band kernel, must be greater than a parameter peak_gate (in dB); and
2. In the event further peak verification is not programmed to occur, the frame's centroid 402 (i.e., the frames temporal mid-point) must be greater than the parameter centroid_thresh, to minimize pre-echo effects caused by selecting a peak which starts too early, as shown in block 405.

Upon conditioning the candidate spectral peak bin, the candidate spectral peak bin may be marked and the peak_width group of bins around the candidate spectral peak bin may be marked as possibly being tonal, pending peak verification, as explained further herein. The candidate spectral peak bin and the group of surrounding marked bins are peak grouped bins The determination of candidate spectral peak bins may result in bins being selected as candidate spectral peak bins as a result of underlying sinusoid or tonal components of the sound, rather than being actual transients. To remove spurious candidate spectral peak bins which are not the result of transient sounds, sinusoidal modeling may be used as a peak verification process, as shown in block 405 of FIG. 4. Peak verification may be done using phase coherence and/or temporal coherence. In this regard, phase coherence checks for consistency of the phase of the candidate spectral peak bin under the main lobe of a spectral peak. Temporal coherence measures the amplitude and frequency continuity between matched pairs of peaks in temporally adjacent FFT frames.

Referring first to peak verification using phase coherence, it should be understood that the Discrete Fourier Transform (DFT) of a real-symmetric analysis window is also real (0-phase), therefore the DFT of a real-symmetric analysis window does not contribute to the phase of the DFT. Further, the DFT of a constant sinusoid, taken using a real symmetric window, may be a translated version of the window multiplied by a constant phase. As such, the phase difference between a candidate spectral peak bin and its two neighboring may be determined, and the result can be integrated to determine a phase difference. The phase difference may then be compared to a phase threshold to determine whether the candidate spectral peak bin is temporal or transient. In this regard, when the phase difference is larger than the phase threshold, a non-sinusoidal component is present at the candidate spectral peak bin indicating a transient structure. Otherwise, the candidate spectral beak bin may indicate a tonal structure.

Turning now to peak verification using temporal coherence, pairs of peaks between a candidate spectral peak bin and a temporally adjacent FFT frame, within a small frequency window, may be determined. The frequency window may be defined by a preprogrammed or user adjustable freq_dev parameter. For each pair of peaks, f_i and f_j, two 3rd order polynomials are calculated. The first polynomial estimates the peak-to-peak frequency trajectory and a second polynomial estimates the peak-to-peak amplitude trajectory. For instance, the frequency polynomial $f(t)=a*t^3+b*t^2+c*t+d$ contains four variables, a, b, c, and d. Accordingly, four constraints are needed to solve the polynomial. For matched peak pairs, f_i and f_j, determined between a candidate spectral peak bin captured at time t0 and a temporally adjacent FFT frame captured at t0+1, the four constrains can be defined as follows, where "fcr" is the frequency change rate:

1. $f(t0)=f\_i$
2. $f(t0+1)=f\_j$
3. $f'(t0)=fcr\_i$
4. $f'(t0+1)=fcr\_j$

The frequency change rate can be estimated using a quadratically interpolated FFT (QIFFT). The QIFFT uses a quadratic model of the peaks from the magnitude and phase spectrum of the discrete Fourier transform (DFT) to obtain estimates for the following parameters of an underlying sinusoid:

1. Instantaneous frequency;
2. Instantaneous amplitude;
3. Instantaneous phase;
4. Frequency change rate (fcr); and
5. Amplitude change rate (acr)

The QIFFT can be derived analytically in the case of Gaussian analysis windows (and correction factors can be estimated for non-Gaussian analysis windows). The 1st step in the QIFFT derivation is to realize that the Fourier transform of a Gaussian windowed amplitude/frequency modulated sinusoid is of the form:

$$\exp(U(w))*\exp(1j*V(w))$$

where w is the frequency variable, and U(w) and V(w) are both quadratic functions with coefficients that depend on above listed parameters, i.e., instantaneous frequency, instantaneous amplitude, instantaneous phase, fcr, and acr.

Using U, V and their derivatives, unbiased estimates of the above 5 parameters may be solved.

If the two matched peaks form a "smooth" sinusoidal trajectory, the 3rd order polynomial should have a small curvature. On the other hand, if the trajectory is not smooth the polynomial will have a wavy and/or jagged trajectory in order to match the four constraints, resulting in a high curvature.

We measure the curvature using the 2nd derivative of f(t) evaluated at the midpoint between the two analysis frames (e.g., $f''(t0+0.5)=6a*(t0+0.5)+2b$), with the curvature measured in $Hz/s^2$. Although the foregoing example shows the curvature as being measured in Hz/s, other units of measure may be used depending on the units which define the frequency f and time t. An amplitude evolution polynomial can be estimated in exactly the same fashion.

Taken together, the curvature of the $2^{nd}$ derivative of f(t) and the curvature of the amplitude evolution polynomial provide an indication as to whether a matched pair of peaks is due to an underlying sinusoid, shown as low curvature, or is due to noise, transients, etc., shown as high curvature. Accordingly, when a bin is part of a matched pair having low curvature, that bin can be marked as verified and processing can continue onto the next pair of peaks until all candidate spectral peak bins are verified. In the event a matched pair has high curvature, the candidate spectral peak bin may be removed from further consideration and unmarked.

A user may adjust the peak verification using temporal coherence to rely more heavily on one of the polynomials more than the others by adjusting a gamma parameter which corresponds to the smoothness of the frequency and amplitude trajectory. In this regard, the total curvature of a spectral peak candidate bin may be defined as:

(1−gamma)*fabsf(freq_curvature)+gamma*fabsf(amp_curvature)

where freq_curvature is the measure of curvature resulting from taking the $2^{nd}$ derivative of the instantaneous frequency track fitted polynomial, amp_curvature is the measure of curvature resulting from taking the $2^{nd}$ derivative of the instantaneous amplitude track fitted polynomial, and Gamma is user tunable weighting used to preference either frequency or amplitude curvature before the peak verification thresholding.

To pass peak verification, the total curvature must be below a user definable parameter peak_verification_threshold for the peak to pass verification. The peak_verification_threshold parameter defines a magnitude which the curvature must remain below. The parameter gamma may be selected from a range of [0,1]. A predefined gamma of 0.1, which puts more emphasis on the smoothness of the frequency trajectory than the amplitude trajectory, may be used. Although other gamma's values may be used as a predefined gamma.

All peak grouped bins passing verification may be marked as tonal if the frame centroid is greater than the centroid_thresh parameter, which minimizes pre-echo effects of determining a peak too early. The remaining bins have their masks left at the previous mask value (from the previous time frame). For all of the bins that aren't verified as a spectral peak or grouped to a spectral peak bin, (i.e., bins which have not been found to include strong sinusoids in the frame) a magnitude and phase consistency check over a period of time may be determined. Magnitude and phase consistency may indicate weaker sinusoidal information which may sound more natural in the tonal structure in comparison to the transient structure. In other words, some bins may include tonal and transient structures, and a determination is needed on which structure to place these bins.

Figure 4:
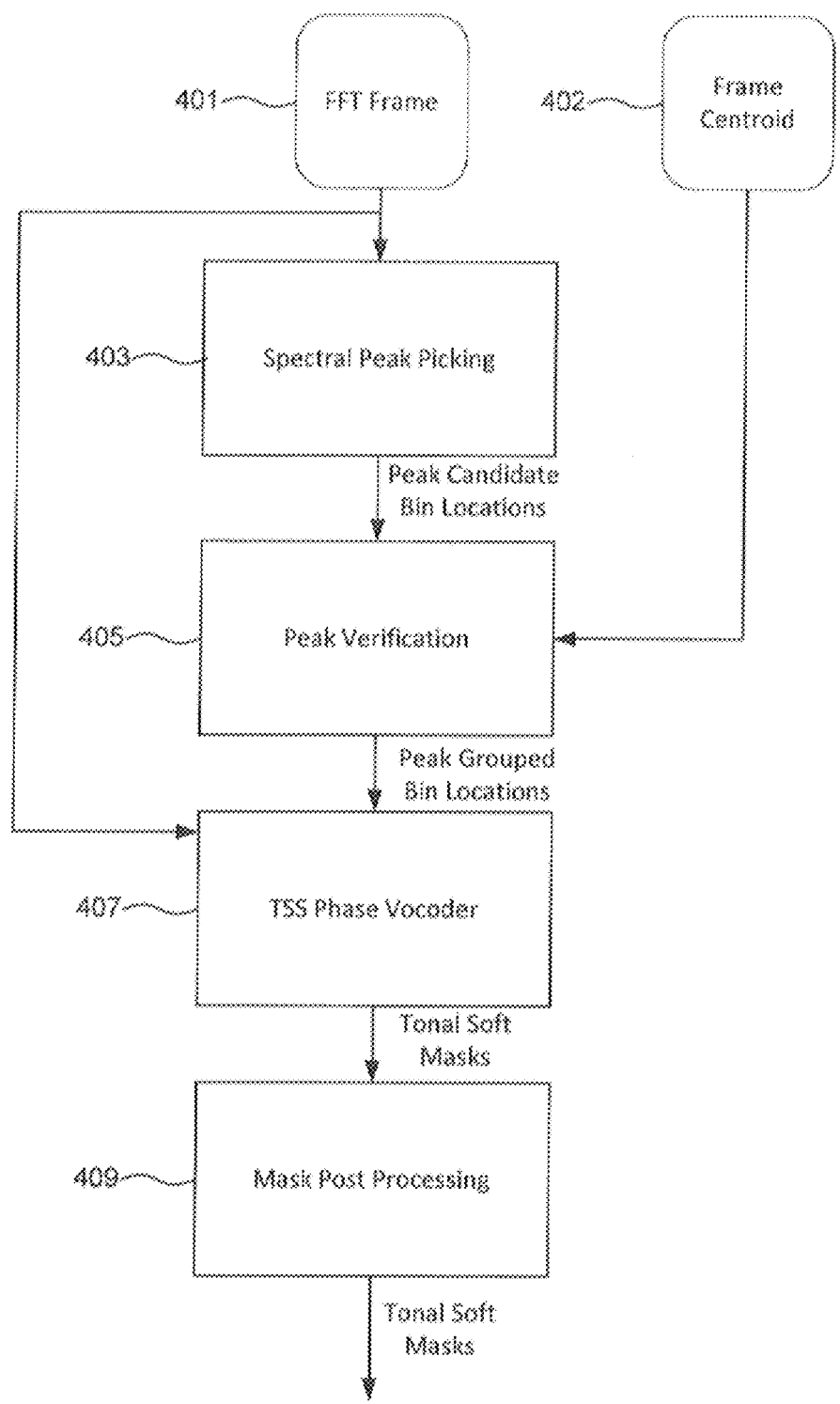
FIG. 4 is a flow diagram of transient stable separation used in frequency spectrum analysis.

In order to determine where to place each of the remaining bins, the remaining bins may be further processed using Transient Stable Separation (TSS), as shown in block 407 of FIG. 4. The TSS is similar to a phase vocoder and is used to determine the consistency of the remaining bins. In this regard, the bins having more consistency are more stable and may be marked as a tonal structure.

The TSS computes, for each non-peaked bin, a single complex measure which combines (i) the difference in estimated instantaneous frequency (inst_freq_diff) computed using a standard phase vocoder approach of first order difference between consecutive frames, and (ii) the current magnitude normalized to the previous magnitude (mag_nrm), which is basically a ratio of magnitude change. The formula to calculate the single complex measure (complex_diff) is as follows:

complex_diff=1+mag_*nrm*\*mag_*nrm*−
2\*mag_*nrm*\*cos *f*(inst_freq_diff)

The complex_diff measure may then be compared to a preprogrammed or user programmable tss_threshold parameter which defines a threshold value to determine a soft masking value for that bin. The soft masking value is equal to:

1/(1+exp(*tss*_threshold-complex_diff))

Hysteresis may be applied when moving from a tonal to a transient via a parameter tss_hysteresis. In this regard, hysteresis helps minimize artifacts that arise from noise or perceptually irrelevant spurious changes to bin consistency. In other words, the hysteresis holds off on tonal bins that require a larger transient event to pull a bin from tonal to transient. For example, if a previous mask value for a bin is greater than 0.5 (dominant tonal), the tss_threshold may be multiplied by the tss_hysteresis in the above soft masking decision.

Upon completing TSS, all bins are marked with a soft mask value between 0 and 1, with 0 being Transient, and 1 being Tonal. However, since many bins are not fully tonal or transient, further mask post processing may be done, as shown in block 409. In this regard, parameterized heuristic filtering on the mask may be performed to smooth out artifacts and act as a three-dimensional "Q" or "order" control (mask amplitude, frame time, and frequency). This may be done by limiting the rate at which the mask can change from tonal or transient and vice versa by implementing two slew limits on the mask change rate, where A. The maximum change rate for bins transitioning from transient to tonal is the parameter changeRateTonal; and B. The maximum change rate for bins transitioning from tonal to transient is the parameter changeRateTransient.

In this regard, a faster change rate will create better separation between the transient and tonal channels at the risk of audible artifacts, while a slower change rate with reduce artifact at the risk of allowing more bleed between the channels.

In addition to heuristic filtering, a control that allows adjustment from an equal volume split (no separation, mask=0.5 for all bins) to the full determined mask value or tonal/transient layer split as well as the ability to bias the mask toward the tonal or transient region may be used. This control is called These controls are called mask_depth and mask_bias. Combined with the slew rate limit controls, mask_depth and mask_bias may allow a user to control the transition between tonal and transient from no transition to a slow transition with channel leakage to a fast transition with less leakage but potentially more artifacts (depending on source audio material). In some instances these controls may be preprogrammed.

Based upon the tonal soft mask for each bin, the transient mask for each bin may be found, as shown in step 307 of FIG. 3. In this regard, the tonal soft mask may be defined as tonal_mask[k], the transient mask ("transient_mask[k]"), may be found using the following formula, where [k] is a bin:

transient_mask[*k*]=1−tonal_mask[*k*]

Bin by bin multiplications may be performed to determine the separate dominant tonal frame and dominant transient frames.

Upon determining the dominant tonal and transient frames, an inverse STFT may be performed to transform the frames back into the separate time domain audio streams. Blocks 311 and 312 in FIG. 3 show a computationally more efficient method of deriving the two time-domain audio streams. Since the Tonal/Transient split is complementary, only one Inverse FFT on the Tonal Stream is needed. The time domain Transient stream is then calculated by simply subtracting the time-domain Tonal stream from the appropriately delayed (for the time it takes do the processing) original input signal.

Transient and tonal structures may also be determined using morphological component analysis (MCA). MCA is a dictionary based transient and tonal separation algorithm based on the insight that a single signal may be represented by combinations of other signals, with each combination of other signals representing the same single signal. In some of these representations certain signal structures may be able to be described more compactly, using fewer coefficients, than other signal structures. MCA attempts to find two representations which each compactly describe different structures in the signal and represent the signal using a combination of both representations in such a way that the fewest total coefficients of each individual representation should only end up representing the portion of the signal which is most efficiently represented by that representation. The signals may then be separated by taking the output from each representation individually.

In order to separate the audio stream into tonal and transient streams using MCA, the audio is divided into equally spaced frames which overlap. This creates a series of equally sized frames with shared data between neighboring frames.

Two structure representations of the audio stream, defined as a set of basis vectors over the length of the frame, the first of which efficiently represents tonal structures and the second of which efficiently represents transient structures and respectively referred to as the tonal and transient dictionaries may be generated. In one example, the tonal dictionary may be a 2048 Gabor dictionary and either a set of overlapped length 128 Gabor dictionaries, or Haar or Coif Wavelet Dictionaries. These dictionaries can be found through the use of a FFT, thereby allowing real time implementation. Although Gabor, Haar, and Coif dictionaries are described, other dictionaries and dictionary sizes are also possible.

The audio stream, now being represented by more than one dictionary results in an overcomplete representation, to which there are a theoretically infinite number of decompositions. To find the decomposition that facilitates the best separation when the structures are reconstructed from the separate dictionaries we need to write a cost function that penalizes structure features from ending up in the wrong dictionary, but doesn't penalize them for ending up in the correct dictionary. In this regard, a combination of penalties based on norm minimization and side information may be used. More particularly, the cost function may contain a number of terms which seek to minimize (1) The total error between the original signal and the reconstruction; (2) The total energy plus total amplitude in the tonal dictionary conditioned upon the phase and amplitude continuity and average spectrum; and (3) The total amplitude in the transient dictionary conditioned upon the average spectrum.

The cost function may be solved using an optimization technique called the "majorization-minimization" technique. The majorization-minimization technique uses iterative shrinking to converge toward a global minimum to the optimization problem. In practice most of the gains happen in the first couple iterations, so the number of iterations may be limited to a predetermined number, such as five, or more or less, if convergence has not been reached.

In one implementation twenty-two steps, defined below, may be implemented to determine transient and tonal structures in an audio stream using morphological component analysis (MCA).

In step (1), a tonal dictionary (Dictionary A) may be created. The basis functions of Dictionary A may be 2048 complex exponentials which form the basis functions of a size 2048 FFT.

In step (2), a transient dictionary may be created. The basis functions of may be 128 complex exponentials (Dictionary B1) for which the basis functions are a size 128 FFT. Alternatively, the basis functions may be a collection of wavelet bases which make up the fast wavelet transform decomposition of a size 128 frame of audio at a selected scale (Dictionary B2).

In step (3), for Dictionary A with the frame Size of 2048, method 1 (i.e., frequency spectrum analysis, described above with regard to FIGS. 3 and 4) may be applied to condition the results. The soft mask from method 1 may be stored as v(mask), store the transient output signal as yTra and the tonal output signal as yTon. The input signal may be divided into overlapping frames, one set each of size 2048 (Set A) and 128 (Set B), applying a properly sized hanning window to each.

In step (4), for each frame in Set A, a size 2048 FFT may be used to find the frames representation in Dictionary A. Likewise, for each frame in Set B either a size 128 FFT may be used to find that frames representation in Dictionary B1 or an appropriate fast wavelet transform may be used to find that frames representation in Dictionary B2.

Step (5) includes repeating step (4) using the size 2048 FFT to yTon to form a signal called YTon and further repeating step 4 using the size 128 FFT or size 128 FWT to yTra to form a signal called YTra.

In step (6), a signal ZTra may be formed. ZTra may be initialized with YTra. Further, signal ZTon may be formed and initialized with YTon.

Step (7) includes estimating the expected spectral shape of ZTon by using a moving average filter with a width of three bins to smooth each frame over frequency and a first order lowpass filter to smooth each bin over time. The same estimation may be done for ZTra, but in the event ZTra is using the wavelet dictionary only smooth over time. The smoothed signals may be stored as STon and STra respectively.

In step (8), for each frame construct tonal and transient penalty vectors. In this regard, PTon=a(STon^2+b) and PTra=a(STra^2+b) where a and b are scalar values greater than 0 set by the user.

In step (9), vector X may be defined, as the set of coefficients for Dictionary A followed by the set of coefficients for Dictionary B. X may be initialized to [YTon, YTra]. X transformed back to the time domain may be vector x.

In step (10), a vector r, which will represent the residual between the true signal y and a reconstruction, be may be initialized to 0. R will represent the vector r transformed into Dictionary A followed by Dictionary B In step (11), a vector Z may be defined which represents the current estimate of X plus the residual R (or error).

In step (12) a minimization problem may be solved by iteratively solving the following steps, steps 13 through 19:

Step (13): R may be found by transforming r via the respective dictionary transforms Step (14): Update Z using Z=X+R Step (15): Tonal shrinkage vector ShTon may be found by Variance=abs(YTon)/STon, ShTon=Variance/(Variance+1)

Step (16): Vector ShTra, representing Transient shrinkage, may be found by shrink=1−STra/abs(ZTra), ShTra=shrink for all shrink>0 and 0 for all shrink<=0.

Step (17): X may be updated using X=Z.*Sh where Sh is the combined shrinkage penalty Sh=[ShTon ShTra] and were. * represent pointwise multiplication.

Step (18): A time domain signal x may be found by transforming X via the dictionaries, and form the new residual r=y−x.

Step (19): Repeat back to step 13.

In step (20), after reaching convergence the vector X will contain the coefficients for the elements in Dictionary A (XTon) followed by the coefficients for the elements in Dictionary B (XTra). XTon may be transformed via Dictionary A to find xTon and transform XTra via Dictionary B to find xTra.

In step (21), overlap-add xTon and xTra to get the tonal and transient output signals.

In step (22), the tonal and transient output signals maybe subtracted from the input signal to get the noisy residual signal r.

As discussed above, MCA works by finding several domain morphologies (transforms) which best represent the underlying structure of the audio signal and forcing the signal to be represented by its simplest description across those domains. If the domains represent perceptually useful structures, then it is possible to separate the signal into these different structural components. This is a type of filtering, but the filtering is done on signal structural content instead of frequency content.

Structural filtering can be seen as an effect by itself, but it is more accurately a broad category of effects, and can be used as an enabling technology for many other effects. In this regard, an input signal which will pass through a structural filter, and from this input signal, based on a set of band edge parameters (i.e., penalties), audio will be diverted into two additional audio streams, one based on its transient structure, and one on its tonal structure. The band edge parameters may vary from very selective (only the most transient material is diverted to the transient band) to non-selective (all audio is diverted to the transient band), however, the sum of the three bands output streams is always identical to the audio input, so these structural filters are, essentially complementary.

In addition to the band edge parameters there are a number of parameters which effect the sharpness of the transition between bands, as well as the amount and type of artifacts that may exist in each band (though the outputs are still complementary, artifacts may appear in any individual band, or in a modified combination of bands). This is similar to the parameters and topologies that determine a frequency filter's shape. Similar to a frequency based filter, a user may make very different decisions on these parameters to achieve a given effect. For ease of reference these parameters may be referred to as "Q": or quality parameters, similar to the common control on parametric EQs.

Figure 5A:
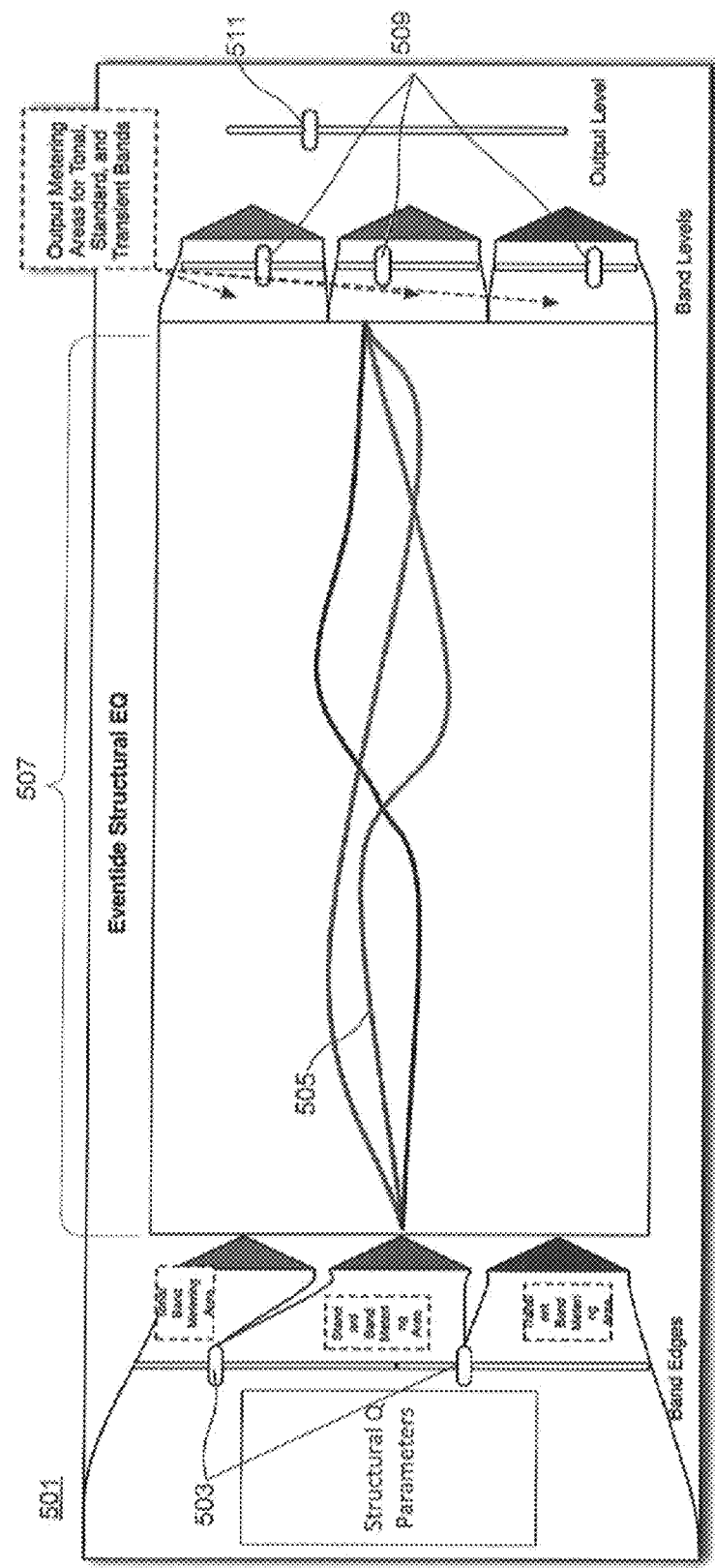
FIG. 5A is an illustration of a example structural EQ system.

An initial application of this technology is the analog to the ubiquitous Parametric EQ. A sketch drawing of an Eventide Structural EQ plug-in, as shown in FIG. 5A. The plug-in 501 is a two-dimensional EQ with 3 structure bands and 8 frequency bands. The first parameter on the left sets the Band Edges 503 between the Tonal, Standard, and Transient bands. Along with any useful Structural Q parameters this will determine the input signals to 3 parallel 8-band parametric EQs 505. The area to the right of the Band Edge sliders animates to graphically show the proportion of signal which is flowing into each band. Initially the band edge sliders can be at the top and bottom which will put all audio into the standard band. Additionally, the area between the sliders and the band arrows can act as an input meter for each band, which will show the user graphically how much audio is entering each band. By clicking on an individual arrow on the left hand side, the band which is under control in the middle window is selected.

The middle portion 507 of the plug-in is the spectrum display and parametric EQ curve for all three bands, as well as the control for the band under control. The spectrum display for all three bands will be available at the same time. This supplies the user with a graphical indication of the difference between the bands, and of their individual frequency content. The EQ curves for each structural band may also be displayed at the same time, but in some instances the non-selected bands may be faded out. The EQ of the selected band on the curve itself may be modified, or with the controls below. A different structural band may be selected by clicking on the appropriate arrow on the left.

In the right portion of the middle EQ section is the structural band mixer. The structural band sliders 509 may set the output level of each structural band in the final mix. The areas between the window and the arrows are output meters for each structural band, these meters may be after the level sliders in the signal chain. Any of the three bands may be played solo by selecting the corresponding arrow at the right. Additionally, there may be a global output level control 511.

This effect is essentially a 3-band structural EQ from left to right, and three 8-band frequency EQs in the center. This is a very powerful effect, but it is also broadly useful in a large number of contexts and uses an idiom that is well understood in the industry, which reduces the chances of confusion. By being simple and linearly additive it also reduces the likelihood of bad sounding artifacts based on the separation process.

Figure 5B:
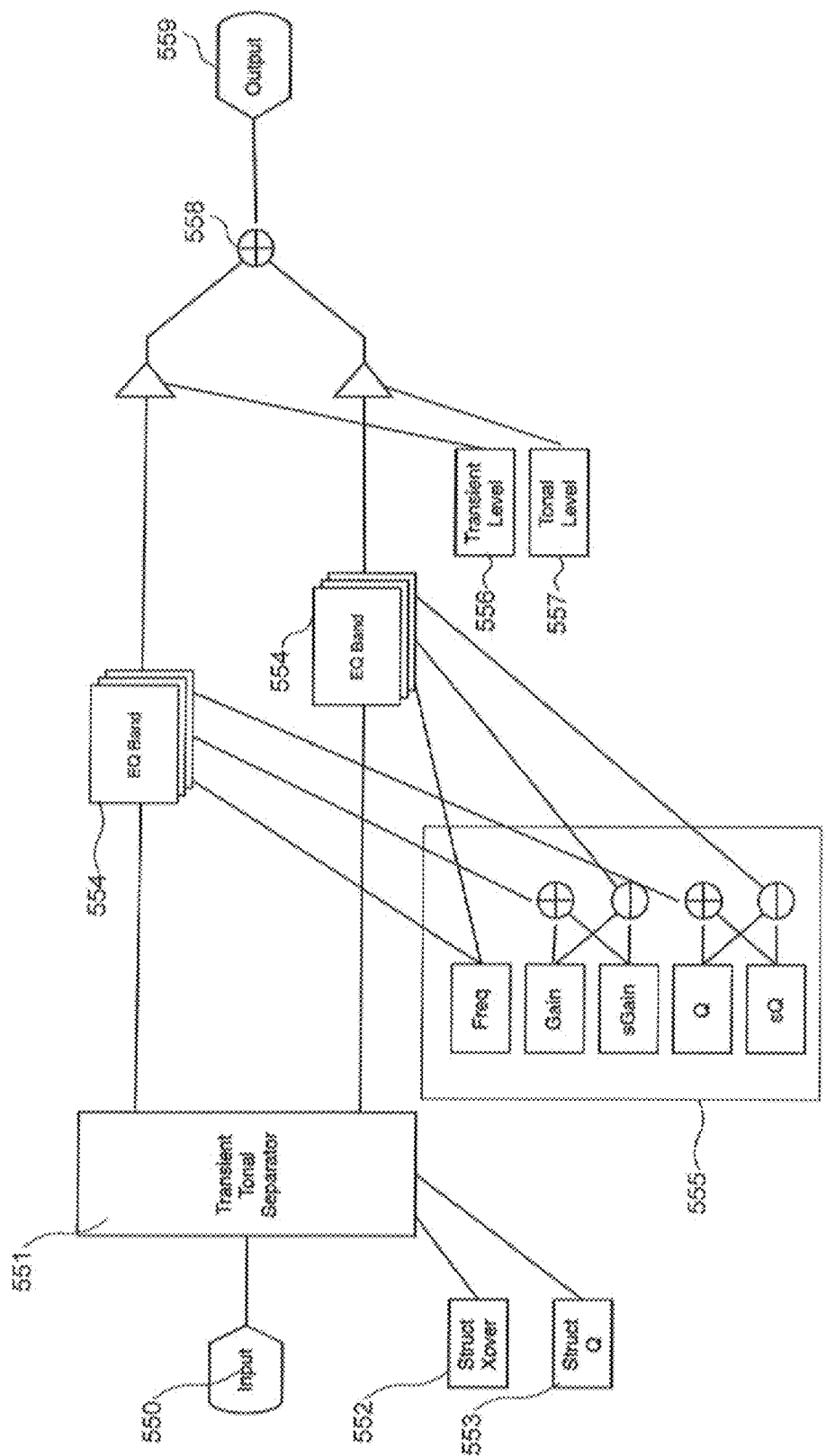
FIG. 5B is a flow diagram of an example structural EQ system.

A flow diagram of processing performed by the Eventide Structural EQ plug-in, is shown in FIG. 5B. In this regard, an audio signal may be received at the input 550 of the plug-in, as shown at 550. The audio signal may be separated into transient and tonal signals by a transient tonal separator (TTS), as shown at 551. The parameters of the TTS may be manipulated through a structural cross-over and structural Q, as shown at 552 and 553, respectively. The separated tonal and transient signals may bass through equalizers 554, at which settings 555 may be adjusted such as frequency, gain, sGain, Q, and sQ. The levels of the tonal and transient signals may be adjusted by tonal level control and transient level control, as shown at 557 and 556, respectively. The leveled transient and tonal signals may then be combined at 558 and output at a certain level, as shown at 559.

As described herein, the resulting tonal and transient streams generated based on frequency spectrum analysis may be affected by a number of adjustable parameters at each stage of processing. In this regard, the parameters for the various stages of frequency spectrum analysis may include:

STFT Overlap/Add Processing
- window_type—(Any constant overlap-app (COLA) window). Choice of analysis/synthesis window shape;
- window_size—(Tradeoff between time and frequency resolution). Length of the window in samples; and
- overlap—(Any overlap that maintains COLA with window choice and length). STFT window overlap amount in percent.

Spectral Peak Picking
- peak_width—(Around 2 to 32 bins). Bin width around a peak;
- octave_kernel_width—(Around 0.1 to 2 octaves). Octave width of smoothed energy surrounding a potential peak candidate;
- peak_gate—(Around −60 to 0 dB). Peak magnitude divided by smoothed energy (from octave_kernel_width) should be greater than peak_gate to be declared a peak candidate.

Spectral Peak Verification (Using Temporal Coherence)
- freq_dev—(Hz). Deviation in Hz allowed for initial peak matching between temporal frames;
- gamma—(A range, such as 0 to 1). Weighting allowing peak verification to preference amplitude or frequency fitted polynomial trajectory curvatures. A 0 value considers only frequency, while a 1 value considers only amplitude. Although a 0-1 range is shown, any range such as 1-10, 0-100, etc., may be used;
- peak_verification_thresh—(Curvature measure, such as 0-1000, or more or less). Threshold by which a spectral peak my be verified. The gamma weighted combination of frequency and amplitude curvature is compared to this threshold; and
- centroid_thresh—(A range, such as 0 to 1). Verified peaks may only be marked Tonal if the temporal energy in the frame is greater than a threshold, where 0 marks the beginning of time in the frame, and 1 marks the end. Although a 0-1 range is shown, any range such as 1-10, 0-100, etc., may be used.

TSS Phase Vocoder Algorithm
- tss_threshold—(A range, such as 0 to 256 consistency measure). Threshold by which the combined magnitude and phase consistency measurement may be compared. May be used as an input into the logistic function to determine a soft tonal mask. Although a 0-256 range is shown, any range such as 1-10, 0-100, 0-512, etc., may be used.
- tss_hysteresis—(A range, such as 0 to 10). Hysteresis multiplier on tss_threshold in the direction of Tonal to Transient transition Although a 0-10 range is shown, any range such as 0-1, 0-100, etc., may be used.

Mask Post Processing
- change_rate_tonal—(A range, such as 0 to 1 sec). Slew rate limit across time adjacent frames for soft mask values transitioning from transient to tonal. Although a 0-1 s range is shown, any range such as 0-10 s, 0-100 s, etc., may be used.

change_rate_transient—(A range, such as 0 to 1 sec). Slew rate limit across time adjacent frames for soft mask values transitioning from tonal to transient. Although a 0-1 s range is shown, any range such as 0-10 s, 0-100 s, etc., may be used.

mask_depth—(A range, such as 0 to 1). Controls the depth away from a soft mask, such as 0.5, which represents no tonal/transient separation, to fully determined soft mask values. Although a 0-1 range is shown, any range such as 0-10, 0-100, etc., may be used.

mask_bias—(A range, such as −1 to 1). Pre-bias towards either Tonal or Transient mask values. A zero value has no bias, −1 biases all the way Transient, 1 biases all the way Tonal. Although a −1-1 range is shown, any range such as 0-1, 0-100, etc., may be used.

Each of the parameters in the various stages of frequency spectrum analysis process may be user and/or machine adjustable. In some instances, the parameters may be pre-programmed.

The large number of parameters may overwhelm a user. As such, the parameters may be condensed into meta-parameters which an end user may use to control one or more of the parameters discussed above. As such, the control of the frequency spectrum analysis may be simplified. In some instances, a user may alternate between meta-parameters and parameters.

Figure 6:
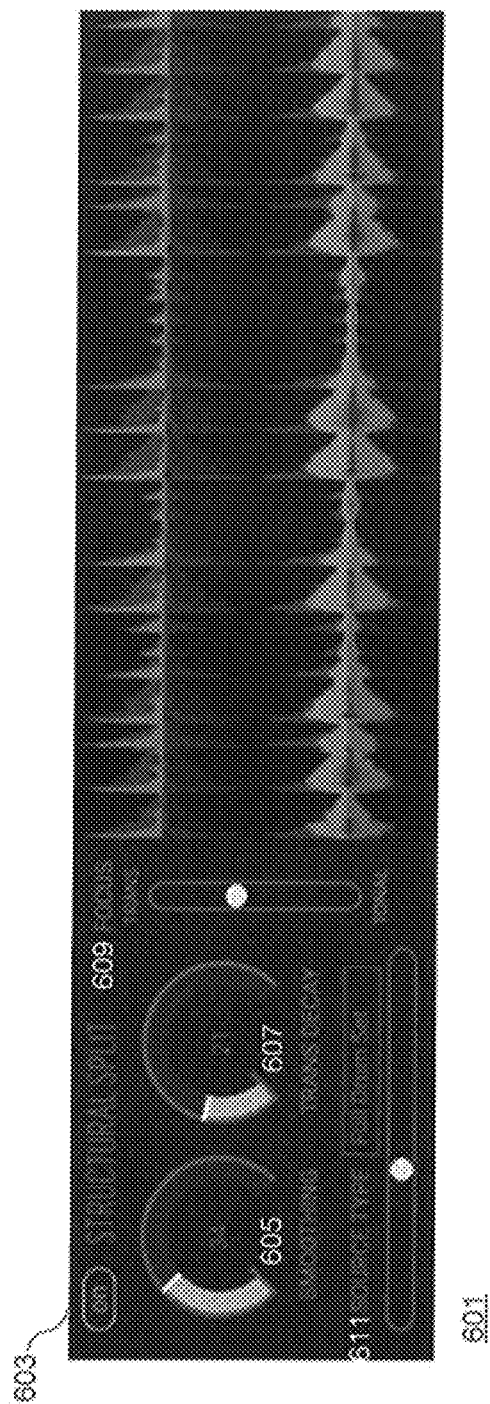

The meta-parameters may be presented to a user through a plug-in, such as plugin 601 of FIG. 6. In some instances the meta-parameters may be presented to users through other interfaces and/or stand-alone hardware interfaces. As shown in FIG. 6, the meta-parameters included in plugin 601 include:

603: Structural Split On/Off—(On or Off). Turns the tonal/transient split process on or off. In other words, this enables or disables frequency spectrum analysis on an audio signal(s).

605: Smoothing—(0 to 100). The Smoothing control is a fine-tuning control used to slow down the fastest transitions (in time and frequency) in both directions between Transient and Tonal. In general, smoothing may control how fast a piece of Transient or Tonal audio can switch to the other stream. Such a parameter may be used to smooth out any artifacts encountered with difficult source signals. In some instances, it can be musically useful in creating softer Transient attacks.

607: Trans Decay—(0 to 100). Trans Decay (i.e., transient decay) may be considered an extension of Smoothing in one direction. In this regard, the Transient Decay control may limit how quickly audio can transition, in time and/or frequency from Transient to Tonal. Larger values of Trans Decay may limit the transition rate substantially. This control could equally be named Tonal Swell, as larger values will also increase the auto-swell period in the Tonal Channel.

609: Focus—(0 to 100, tonal to transient). "Focuses" the sonic energy towards either the Transient or Tonal audio channel, with extreme settings pushing all the energy into either Transient (value of 1) or Tonal (value of 0). However, the real separation magic occurs in the middle settings, where Focus sets the main transition region or decision point where audio splits (in time and frequency) into the separate Transient and Tonal streams.

611: Source Type—(several musical sources). Sets coarse algorithmic tunings for different audio sources as suggestions for the separation task, so it's generally best to match the Source Type to the input audio. These coarse Source Type tunings essentially scale the internal algorithm parameters used by the Focus Control to split the input audio.

Each of the meta-parameters may be mapped to one or more of the aforementioned parameters. For instance, Structural Split On/Off may be mapped to mask_depth. In this regard, Structural Split "on" may set mask_depth to 1, and Structural Split "off" may set mask_depth to 0, essentially bypassing the tonal/transient split. Smooth may scale change_rate_tonal and change_rate_transient from 0 to 50 milliseconds.

Trans Decay may scale change_rate_tonal from 0 to 1 second.

Focus may scales tss_threshold, tss_hysteresis, peak_gate, octave_kernel_width, centroid_thresh, peak_verification_thresh, and mask_bias with minimum and maximum values determined by Source Type.

Source Type may be mapped to window_type, window_size, and overlap. Source Type may also the minimum and maximum values for the Focus scaling of the parameters mapped to Focus. An example of the parameter values set by Source Type for a specific case of a drum set, tuned heuristically by expert product designers, are shown below. Each source may have different parameter values set by Source Type. Additionally, the parameters may be adjustable.

For Source Type=Full Drum Set:
window_type=Blackman; window_size=1536; overlap=66.67% (⅔)

As Focus scales, such as from 20 to 80, (i.e., Tonal to Transient), the follow parameters may scale accordingly:
tss_threshold: 20 to 10;
tss_hysteresis: 9 to 5;
peak_gate: −55 dB to −32.5 dB;
octave_kernel_width: 0.6 to 1;
centroid_thresh: 0.65 to 0.55; and
peak_verification_thresh: 10 to 1.

In some instances, the mask bias may be used to force the signal to be Tonal or Transient. For instance, as Focus scales 0 to 30, mask_bias may scale from 1 to 0. In another instance, as Focus scales from 70 to 100, mask_bias may scale 0 to −1.

Figure 7:
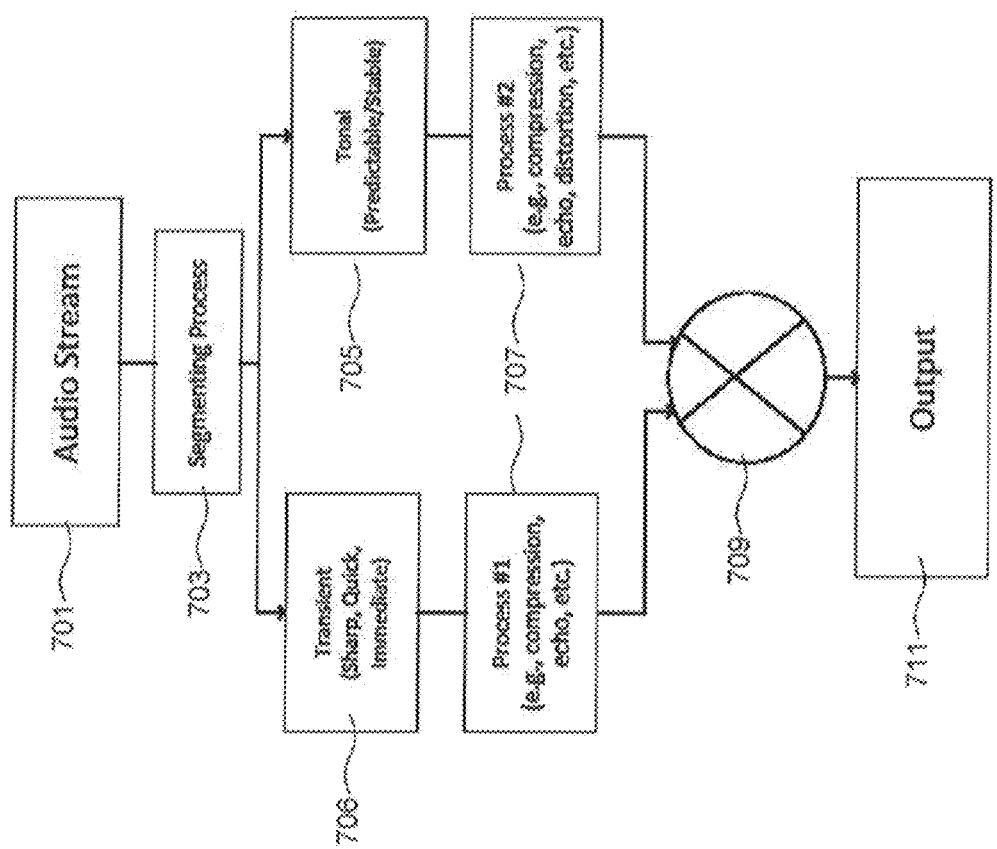
FIG. 7 is a flow diagram of processing an audio stream.

Processing of the transient and tonal structures of an audio stream may occur independently. As such, a user may manipulate the tonal structure independently from the transient structure using known effects processing, such as echo, compression, distortion, delay, etc. Similarly, the transient structure may be manipulated independently of the tonal structure. The manipulated (or non-manipulated) structures may then be added back together to generate an output of a new audio stream, which includes both the transient and tonal structures having the applied effects. For example, as shown in FIG. 7, an audio stream 701 may be received and subjected to the segmenting processes implemented using either MCA or frequency spectrum analysis, as shown at block 703. The resulting transient structure 706 and tonal structure 705 may be independently manipulated, as shown in blocks 707. The manipulated transient structure 706 and tonal structure 705 may then be added together as shown in block 709 and output as a new audio stream as shown in block 711.

In addition to the foregoing, cross-breeding of the transient and tonal structures may be generated. In this regard, two audio streams may each be separated into tonal and transient structures. The tonal and/or transient structure of one signal may then be added to the tonal and/or transient component of the other signal to "cross-breed" the streams. For example, a slap of a drum stick in first audio stream (i.e., the transient portion of the first audio stream) may be added to a drum beat in a second stream (e.g., the tonal portion of the second stream).

The invention claimed is:

1. An audio processing method comprising:
receiving a first audio signal generated by a first sound source;
receiving a second audio signal generated by a second sound source;
segmenting, by one or more processors, the first audio signal into a first tonal audio stream and a first transient audio stream;
segmenting, by the or more processors, the second audio signal into a second tonal audio stream and a second transient audio stream;
selectively combining either the first tonal audio stream or the first transient audio stream with either the second tonal audio stream or the second transient audio stream,
wherein segmenting the first and second audio signals includes:
isolating spectral peaks within the first and second audio signals;
determining the spectral stability of the spectral peaks; and
segmenting portions of the first and second audio signals associated with spectral peaks having stability greater than a threshold value into the first and second tonal streams, respectively.

2. The audio processing method of claim 1, further comprising:
selectively adding one or more sound effects to the first tonal stream, the second tonal stream, the first transient stream, and/or the second transient stream.

3. The method of claim 1, wherein the first and second transient streams include portions of the first audio signal and second audio signal, respectively, which represent sharp, quick, and immediate sounds.

4. The method of claim 1, wherein the first and second tonal streams include a portions of the first audio signal and second audio signal, respectively, which represent stable, repetitive, and otherwise predictable sounds.

5. The method of claim 1, further comprising, segmenting portions of the first and second audio signals associated with spectral peaks having stability less than a threshold value into the first and second transient streams, respectively.

6. The method of claim 1, wherein isolating spectral peaks within the first and second audio signals includes:
processing a segment of the first and second audio signals with a Short Time Fourier Transform (STFT) to generate a frequency domain representation of the respective segments.

7. The method of claim 6, where determining the spectral stability of the spectral peaks includes portioning the frequency domain representation into bins having a fixed frequency width; and
selecting bins having a consistent magnitude and frequency as spectral peaks.

8. The method of claim 1, wherein segmenting the first and second audio signals into respective a tonal streams and transient streams comprises performing morphological component analysis (MCA) on the first and second audio signals.

9. The method of claim 8, wherein MCA includes defining a tonal dictionary defined by a first set of complex exponentials which form a first set of basis functions for a Fast Fourier Transform (FFT) and a transient dictionary defined by a second set of complex exponentials which form a second set of basis functions for another FFT, wherein the first set of basis functions is larger than the second set of basis functions.

10. The method of claim 8, wherein MCA includes defining a transient dictionary as a collection of wavelet bases which make up a fast wavelet transform decomposition of a frame of the first and second audio signals at a selected scale.

11. An audio processing system comprising one or more computing devices configured to:
receive a first audio signal generated by a first sound source;
receive a second audio signal generated by a second sound source;
segment the first audio signal into a first tonal audio stream and a first transient audio stream;
segment the second audio signal into a second tonal audio stream and a second transient audio stream;
selectively combine either the first tonal audio stream or the first transient audio stream with either the second tonal audio stream or the second transient audio stream,
wherein segmenting the one or more audio streams into structural components comprising a tonal stream and a transient stream comprises:
isolating spectral peaks within the one or more audio streams;
determining the spectral stability of the spectral peaks; and
segmenting portions of the one or more audio streams associated spectral peaks having stability greater than a threshold value into the tonal stream.

12. The audio processing system of claim 11, further configured to:
selectively add one or more sound effects to the first tonal stream, the second tonal stream, the first transient stream, and/or the second transient stream.

13. The audio processing system of claim 11, wherein the first and second transient streams include portions of the first audio signal and second audio signal, respectively, which represent sharp, quick, and immediate sounds.

14. The audio processing system of claim 11, wherein the first and second tonal streams include a portions of the first audio signal and second audio signal, respectively, which represent stable, repetitive, and otherwise predictable sounds.

15. The audio processing system of claim 11, further comprising, segmenting portions of the first and second audio signals associated with spectral peaks having stability less than a threshold value into the first and second transient streams, respectively.

16. The audio processing system of claim 11, wherein isolating spectral peaks within the first and second audio signals includes:
processing a segment of the first and second audio signals with a Short Time Fourier Transform (STFT) to generate a frequency domain representation of the respective segments.

17. The audio processing system of claim 16, where determining the spectral stability of the spectral peaks includes portioning the frequency domain representation into bins having a fixed frequency width; and
selecting bins having a consistent magnitude and frequency as spectral peaks.

18. The audio processing system of claim 11, wherein segmenting the first and second audio signals into respective a tonal streams and transient streams comprises performing morphological component analysis (MCA) on the first and second audio signals.

19. The audio processing system of claim 18, wherein MCA includes defining a tonal dictionary defined by a first set of complex exponentials which form a first set of basis functions for a Fast Fourier Transform (FFT) and a transient dictionary defined by a second set of complex exponentials which form a second set of basis functions for another FFT, wherein the first set of basis functions is larger than the second set of basis functions.

20. The audio processing system of claim 18, wherein MCA includes defining a transient dictionary as a collection of wavelet bases which make up a fast wavelet transform decomposition of a frame of the first and second audio signals at a selected scale.

* * * * *